(12) United States Patent
Wang et al.

(10) Patent No.: US 12,555,353 B2
(45) Date of Patent: Feb. 17, 2026

(54) DETECTING FINE-GRAINED SIMILARITY IN IMAGES

(71) Applicant: INTERNATIONAL BUSINESS MACHINES CORPORATION, Armonk, NY (US)

(72) Inventors: Fei Wang, Dalian (CN); Xue Ping Liu, Beijing (CN); Dan Zhang, Beijing (CN); Yun Jing Zhao, Beijing (CN); Kun Yan Yin, Ningbo (CN); Zhi Xing Peng, Beijing (CN); Jian Long Sun, Hebei (CN)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 17/971,987

(22) Filed: Oct. 24, 2022

(65) Prior Publication Data
US 2024/0135675 A1 Apr. 25, 2024
US 2024/0233322 A9 Jul. 11, 2024

(51) Int. Cl.
*G06V 10/74* (2022.01)
*G06F 16/532* (2019.01)
(Continued)

(52) U.S. Cl.
CPC .......... *G06V 10/761* (2022.01); *G06F 16/532* (2019.01); *G06F 16/56* (2019.01);
(Continued)

(58) Field of Classification Search
CPC .... G06V 10/761; G06V 10/22; G06V 10/462; G06V 10/759; G06V 10/757; G06F 16/532; G06F 16/56; G06F 18/22
(Continued)

(56) References Cited

U.S. PATENT DOCUMENTS 8,428,397 B1 * 4/2013 Brandt .............. G06F 18/24137
382/305
9,767,381 B2 * 9/2017 Rodríguez-Serrano ......................
G06V 20/63
(Continued)

FOREIGN PATENT DOCUMENTS

CN 103116890 A 5/2013
CN 103295022 A 9/2013
(Continued)

OTHER PUBLICATIONS

Q. Yan, L. Xu, J. Shi and J. Jia, "Hierarchical Saliency Detection," 2013 IEEE Conference on Computer Vision and Pattern Recognition, Portland, OR, USA, 2013, pp. 1155-1162. (Year: 2013).*
(Continued)

*Primary Examiner* — Kathleen Y Dulaney
(74) *Attorney, Agent, or Firm* — Harrity & Harrity, LLP (57) ABSTRACT

Detecting fine-grained similarity in image includes determining a core area of a search image by generating an image salient map from a plurality of layers of the search image and determining a connected area based on the image salient map. Feature descriptors are generated from the core area of the search image. A plurality of capsule vectors are generated from different ones of a plurality of keypoints of the feature descriptors. Capsule vectors of the search image are compared with capsule vectors of each image of the dataset to generate a top-K matrix. Similarity scores for the top-K matrix are calculated. One or more image of the dataset having fine-grained similarity with the search image are selected based a bundled similarity score for each image of the dataset. The bundled similarity score is a summation of the similarity scores of the image.

18 Claims, 6 Drawing Sheets

(51) Int. Cl.
*G06F 16/56* (2019.01)
*G06V 10/22* (2022.01)
*G06V 10/46* (2022.01)
*G06V 10/75* (2022.01)

(52) U.S. Cl.
CPC ............ *G06V 10/22* (2022.01); *G06V 10/462* (2022.01); *G06V 10/759* (2022.01)

(58) Field of Classification Search
USPC ............. 382/195, 305; 707/E17.03, 999.005
See application file for complete search history.

(56) References Cited

U.S. PATENT DOCUMENTS

| | | | |
|---|---|---|---|
| 10,120,879 B2 | 11/2018 | An et al. | |
| 10,210,252 B2 | 2/2019 | Pereira et al. | |
| 10,339,419 B2 | 7/2019 | Song et al. | |
| 10,395,143 B2 | 8/2019 | Harary et al. | |
| 11,366,981 B1* | 6/2022 | Paz-Perez | G06V 10/778 |
| 2009/0282025 A1* | 11/2009 | Winter | G06V 10/945 |
| | | | 707/999.005 |
| 2011/0103697 A1* | 5/2011 | Magai | G06V 10/462 |
| | | | 382/195 |
| 2015/0269191 A1* | 9/2015 | Duan | G06F 16/5854 |
| | | | 382/305 |
| 2016/0048536 A1* | 2/2016 | Di | G06F 16/583 |
| | | | 382/165 |
| 2016/0155011 A1* | 6/2016 | Sulc | G06V 10/757 |
| | | | 382/103 |
| 2017/0293638 A1* | 10/2017 | He | G06N 3/044 |
| 2019/0095465 A1* | 3/2019 | Zhai | G06V 10/761 |
| 2020/0156254 A1* | 5/2020 | Li | G06V 30/248 |
| 2021/0209356 A1* | 7/2021 | Wang | G06V 30/416 |
| 2023/0334821 A1* | 10/2023 | Gao | G06V 10/753 |
| 2023/0394783 A1* | 12/2023 | Matsunaga | G06F 16/583 |

FOREIGN PATENT DOCUMENTS

| | | |
|---|---|---|
| CN | 102663391 B | 9/2015 |
| CN | 103838864 B | 2/2017 |
| CN | 105138672 B | 8/2018 |
| CN | 106227851 B | 10/2019 |
| CN | 105677898 | 7/2021 |
| WO | 2019/019680 A1 | 1/2019 |

OTHER PUBLICATIONS

Liu, J. et al., "An improved image retrieval method based on sift algorithm and saliency map," In2014 11th International Conference on Fuzzy Systems and Knowledge Discovery (FSKD), Aug. 19, 2014, pp. 766-770, IEEE.

Ye, L. et al., "Saliency detection via similar image retrieval," IEEE Signal Processing Letters, Apr. 27, 2016, vol. 23, No. 6, pp. 838-842.

Wang, J. et al., "Learning fine-grained image similarity with deep ranking," InProceedings of the IEEE Conference on Computer Vision and Pattern Recognition, 2014, pp. 1386-1393.

Ge, Y. et al., "Self-supervising fine-grained region similarities for large-scale image localization," InEuropean Conference on Computer Vision, Aug. 23, 2020, pp. 369-386.

Yan, Q. et al., "Hierarchical saliency detection," InProceedings of the IEEE Conference on Computer Vision and Pattern Recognition, 2013, pp. 1155-1162.

Mell, P. et al., The NIST Definition of Cloud Computing, National Institute of Standards and Technology, U.S. Dept. of Commerce, Special Publication 800-145, Sep. 2011, 7 pg.

Mancuso Christopher, "DDR64 Petri Dish Photos. figshare", Figure, Aug. 5, 2021, 01 page. https://doi.org/10.6084/m9.figshare.15117558.v1.

* cited by examiner

```
┌─────────────────────────────────────┐
│ DETERMINE A CORE AREA OF A SEARCH IMAGE │
│ BY GENERATING AN IMAGE SALIENT MAP FROM A │
│ PLURALITY OF LAYERS OF THE SEARCH IMAGE │
│ AND DETERMINING A CONNECTED AREA BASED │
│ ON THE IMAGE SALIENT MAP            │
│ 302                                 │
└─────────────────────────────────────┘
                  │
┌─────────────────────────────────────┐
│ GENERATE A PLURALITY OF FEATURE     │
│ DESCRIPTORS                         │
│ 304                                 │
└─────────────────────────────────────┘
                  │
┌─────────────────────────────────────┐
│ GENERATE A PLURALITY OF CAPSULE VECTORS │
│ FOR THE SEARCH IMAGE FROM DIFFERENT ONES │
│ OF THE PLURALITY OF FEATURE DESCRIPTORS │
│ 306                                 │
└─────────────────────────────────────┘
                  │
┌─────────────────────────────────────┐
│ COMPARE EACH CAPSULE VECTOR OF THE  │
│ SEARCH IMAGE WITH A CORRESPONDING   │
│ CAPSULE VECTOR FOR EACH IMAGE OF THE│
│ DATASET TO GENERATE A TOP-K MATRIX  │
│ 308                                 │
└─────────────────────────────────────┘
                  │
┌─────────────────────────────────────┐
│ COMPUTE SIMILARITY SCORES FOR THE TOP-K │
│ MATRIX                              │
│ 310                                 │
└─────────────────────────────────────┘
                  │
┌─────────────────────────────────────┐
│ SUM SIMILARITY SCORES FOR IMAGES OF TOP-K │
│ MATRIX                              │
│ 312                                 │
└─────────────────────────────────────┘
                  │
┌─────────────────────────────────────┐
│ SELECT ONE OR MORE IMAGES OF THE DATASET │
│ HAVING FINE-GRAINED SIMILARITY WITH THE │
│ SEARCH IMAGE                        │
│ 314                                 │
└─────────────────────────────────────┘
```

| y1 | y2 | y3 | y4 | y5 | y6 | y7 |

FIG. 7

DETECTING FINE-GRAINED SIMILARITY IN IMAGES

BACKGROUND

This disclosure relates to image processing and, more particularly, to detecting fine-grained similarity in images.

The ability to evaluate and detect similarity among images is a technology that is used in a variety of different computer-based applications. These computer-based applications can include, but are not limited to, image search, recommendation systems, and duplicate image detection and removal.

One approach for determining image similarity relies on the identification of global features within images. Global features may be extracted from images using techniques such as Histogram of Oriented Gradients (HOG) or Scale-Invariant Feature Transform (SIFT). When searching for images that are similar to a given image referred to as a "search image," global features are extracted from the search image and encoded so that the search image may be represented as a single vector. The vector of the search image may be compared with global features extracted from images of a dataset to be searched, where the extracted features are also encoded as vectors. Similarity may be measured between the search image and the respective images of the dataset by calculating the distance between the vector of the dataset and the vector for each respective image of the dataset. Those images of the dataset having the smallest distance to the search image are considered similar or matches. Such image processing techniques tend to work well when comparing images across different classes of images. With respect to detecting similarity among images within a same class, where the images of the dataset are very similar, such techniques are unable to discern fine-grained similarities among images.

Another approach for determining image similarity relies on supervised machine learning. While supervised machine learning-based approaches (e.g., deep learning) tend to perform well on specific tasks (e.g., matching specific search images), supervised machine learning is not generalizable. That is, any time the search image changes, the machine learning model must be retrained for use with new content, e.g., new search images. The need for continual retraining makes this approach impractical.

Neither approach is capable of efficiently measuring fine-grained image similarity among images within a same class of images wherein the images of the dataset have low levels of information, e.g., are very similar and differ only in specific regions.

SUMMARY

In one or more embodiments, a method includes determining a core area of a search image by generating an image salient map from a plurality of layers of the search image and determining a connected area based on the image salient map. The method includes generating, from a search image, a modified search image having a core area with regions external to the core area masked. The method includes generating, using computer hardware and from the modified search image, feature descriptors. The method includes generating, using the computer hardware, a plurality of capsule vectors for the search image from different ones of a plurality of keypoints of the feature descriptors. The method includes comparing, using the computer hardware, capsule vectors of the search image with capsule vectors of each image of a dataset to generate a top-K matrix of capsule vectors for the images of the dataset. The method includes computing similarity scores for the top-K matrix of capsule vectors. The method also includes selecting, using the computer hardware, one or more images of the dataset having fine-grained similarity with the search image based a bundled similarity score for each image of the dataset. The bundled similarity score is a summation of the similarity scores of the image from the top-K matrix.

In one aspect, each similarity score of the top-K matrix is capsule vector specific and image specific.

In another aspect, the bundled similarity score for each image is a summation of each similarity score for the image. As noted, each similarity score is capsule vector specific and image specific.

In another aspect, each similarity score includes a gaussian component and a distance component.

In another aspect, generating the plurality of capsule vectors includes performing dynamic routing of the feature descriptors to form groups of selected ones of the feature descriptors. Generating the plurality of capsule vectors includes, for each group, generating a capsule vector by determining a weighted sum of the feature descriptors of the group.

In another aspect, groups include a maximum number of keypoints.

In another aspect, the feature descriptors are generated using a dense scale invariant feature transformer (D-SIFT) algorithm.

In one or more embodiments, a system includes a processor configured to initiate executable operations as described within this disclosure.

In one or more embodiments, a computer program product includes one or more computer readable storage mediums having program instructions embodied therewith. The program instructions are executable by one or more processors to cause the one or more processors to execute operations as described within this disclosure.

This Summary section is provided merely to introduce certain concepts and not to identify any key or essential features of the claimed subject matter. Other features of the inventive arrangements will be apparent from the accompanying drawings and from the following detailed description.

DETAILED DESCRIPTION

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to image processing and, more particularly, to detecting fine-grained similarity in images. In accordance with the inventive arrangements described within this disclosure, methods, systems, and computer program products are provided that are capable of detecting fine-grained similarity among images. The inventive arrangements may be used to search for images in a dataset of images that are similar to a given search image. The images of the dataset may be of a same or similar field or class. That is, fine-grained similarity means that the search image and the images of the dataset are very similar and only differ in certain specific regions.

The inventive arrangements utilize image processing techniques to detect a core area of a target image. The core area is considered a region of the search image that includes one or more salient objects. Salient objects are considered objects of the image that are most noticeable or important. The inventive arrangements are capable of generating local feature vectors from the core area. In one aspect, the local feature vectors may be generated as capsule vectors. The inventive arrangements are capable of searching images of a dataset to determine those images of the dataset that are considered similar to the search image based on a comparison of the capsule vectors of the search image to capsule vectors of the images of the dataset. Each capsule vector represents a local feature of the search image (or image of the dataset as the case may be).

In one aspect, rather than searching on a per image basis, the searching is performed on a per-local feature basis. That is, for each local feature of the search image, image(s) of the dataset are determined that closely match that particular local feature of the search image. The search process results in a top-K matrix of similarity scores for images of the dataset. The top-K matrix specifies similarity scores on a per-local feature basis and a per image basis. As noted, each local feature may be represented by a capsule vector. The resulting ranking of images of the dataset in terms of similarity to the search image may be determined by, for each image of the dataset, summing the similarity score of each local feature of the image. The resulting summed scores may be used to sort and/or determine the image(s) of the dataset that most closely match the search image.

The inventive arrangements are capable of determining fine-grained similarity among a plurality of images where other conventional image search techniques may simply consider each of the images as being equally similar. Using the inventive arrangements described herein, similarities between images using fine-grained details may be detected used to determine those images that are most similar and/or rank the images in terms of similarity for scenarios in which other conventional image search techniques are unable to do so.

Further aspects of the inventive arrangements are described below with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
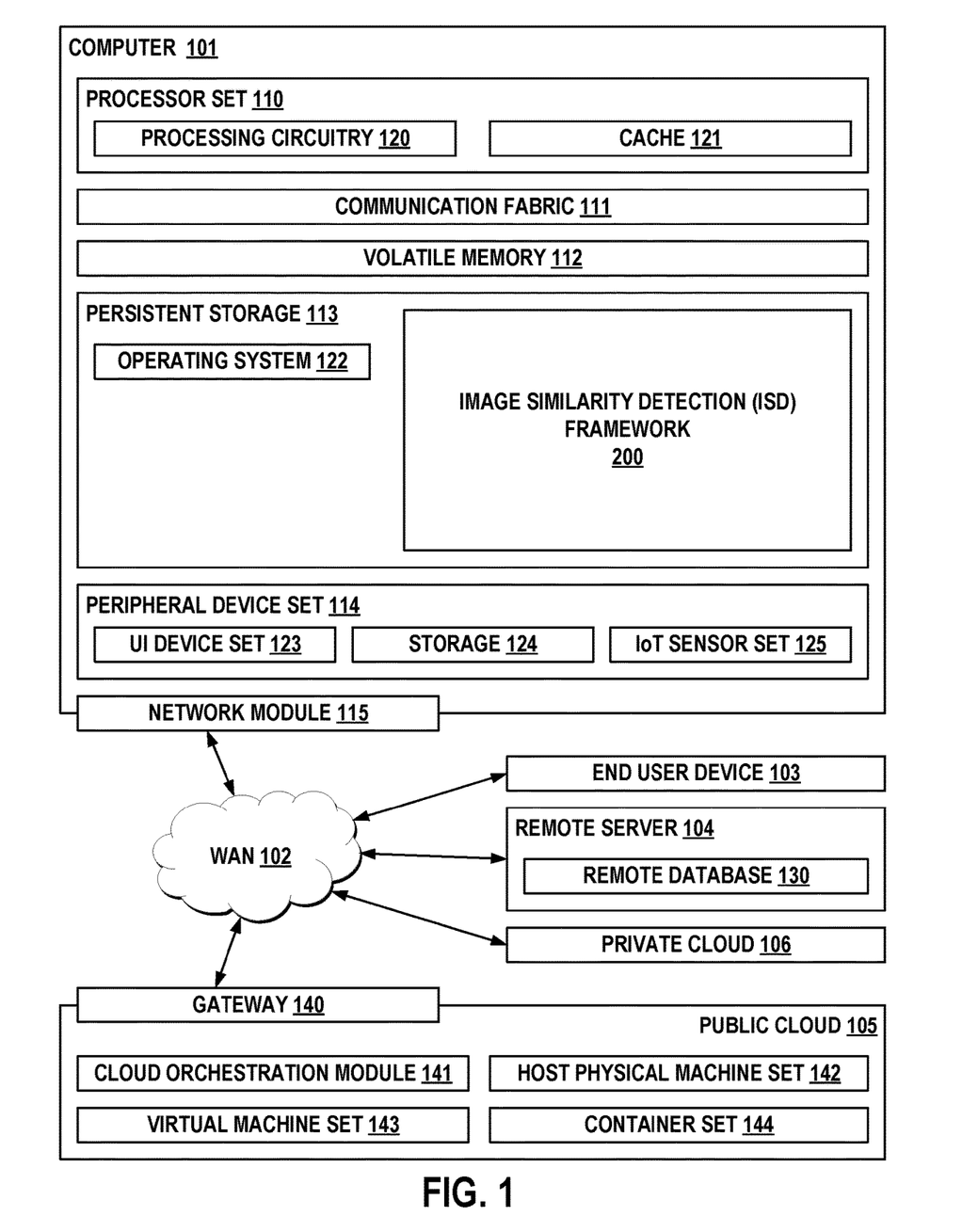
FIG. 1 illustrates an example of a computing environment that is capable of implementing an image similarity detection (ISD) framework.

Referring to FIG. 1, computing environment 100 contains an example of an environment for the execution of at least some of the computer code involved in performing the inventive methods, such as image similarity detection (ISD) framework 200, which is capable of performing image similarity detection. Within this disclosure, ISD framework 200 implements a fine-grained image similarity technique that is capable of comparing images that are very similar and that may differ only with respect to a particular region. ISD framework 200 may be implemented as executable program code or instructions. ISD framework 200 is capable of, upon execution, determining whether one or more images of a dataset are similar to a search image. ISD framework 200 is capable of detecting similarities among images that are closely related or very similar in nature. That is, ISD framework 200 is capable of comparing images to detect similarities based on a per-local feature vector basis which reflects the fine-grained features of the images being compared. By comparison, many conventional techniques compare entire images using global features where the images are represented as a single vector. Such other techniques are not capable of accurately capturing and/or comparing fine-grained features as is the case with ISD framework 200.

In addition to ISD framework 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and ISD framework 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored and/or implemented in ISD framework 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in ISD framework 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (e.g., secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (e.g., a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (e.g., private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
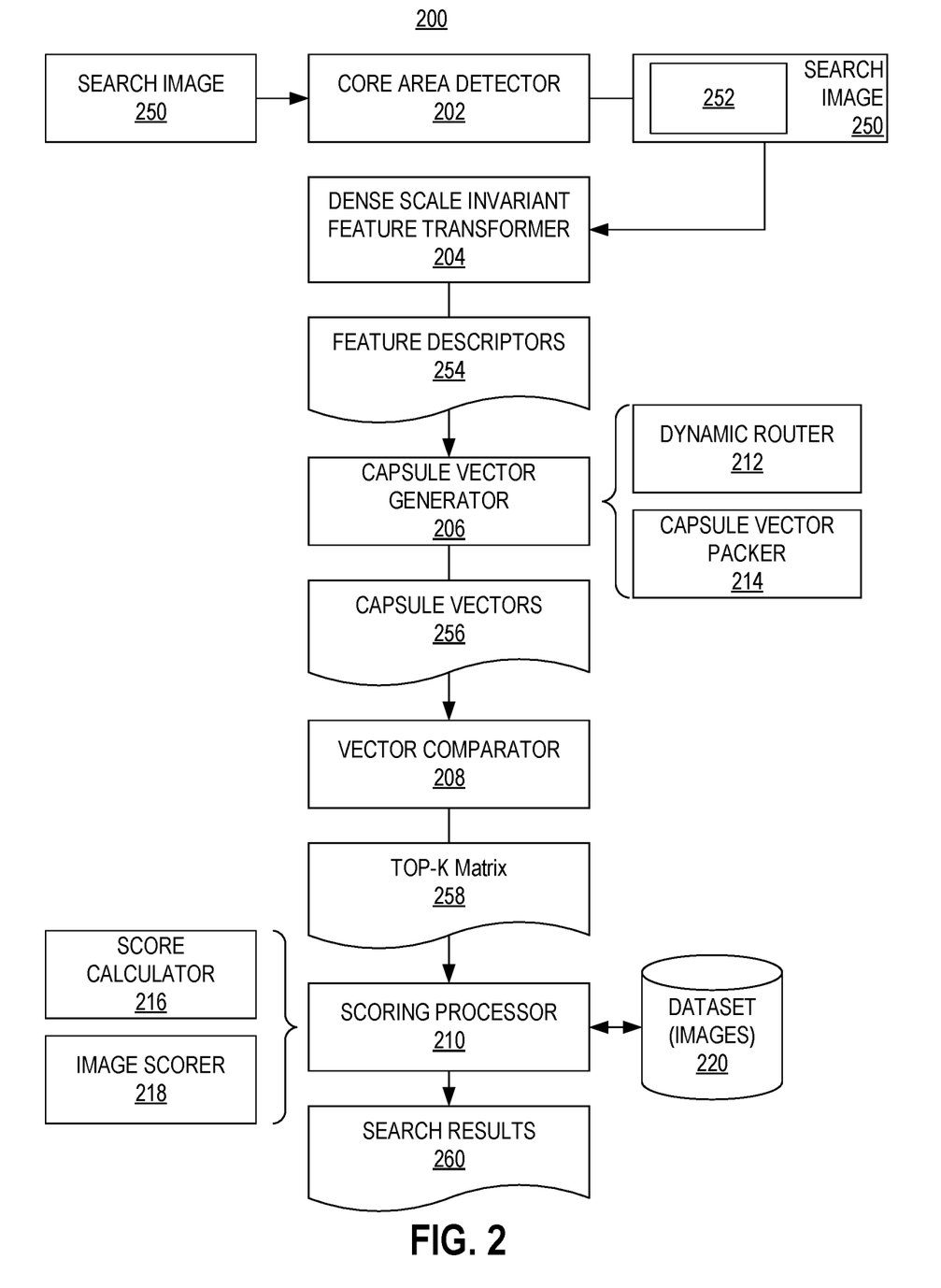
FIG. 2 illustrates an example architecture for the executable ISD framework of FIG. 1.

FIG. 2 illustrates an example architecture for the executable ISD framework 200 of FIG. 1. In the example of FIG. 2, ISD framework 200 includes a core area detector 202, a dense scale invariant feature transformer (D-SIFT) 204, a capsule vector generator 206, a vector comparator 208, and a scoring processor 210. Capsule vector generator 206 may include a dynamic router 212 and a capsule vector packer 214. Scoring processor 210 may include a score calculator 216 and an image scorer 218. In the example, ISD framework 200 may access a dataset 220 that stores a plurality of images that may be searched to locate one or more images that are similar or match a given search image 250. Dataset 220 may be included in computer 101 or within another computer system such as EUD 103, remote server 104, private cloud 106, and/or public cloud 105.

Figure 3:
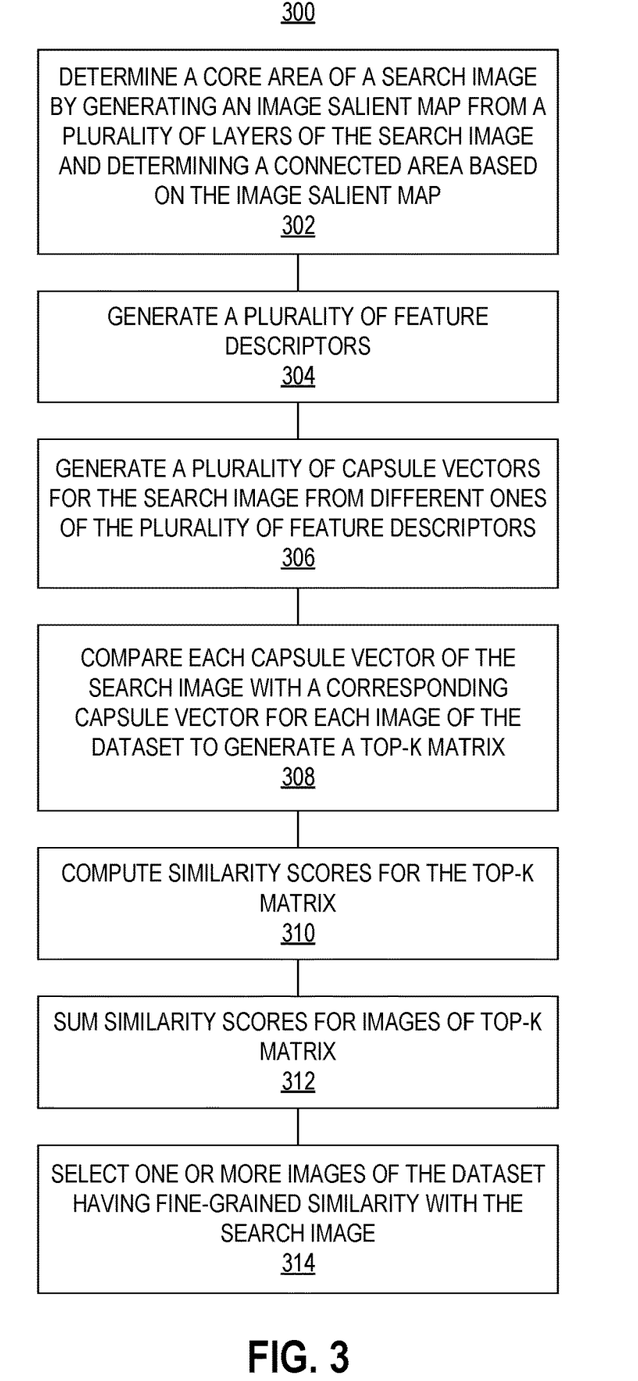
FIG. 3 illustrates an example method of operation of the ISD framework of FIGS. 1 and 2.

FIG. 3 illustrates an example method 300 of operation of the ISD framework 200 of FIGS. 1 and 2. Referring to FIGS. 2 and 3 collectively, in block 302, core area detector 202 receives search image 250. Core area detector 202 determines a core area 252 of search image 250. Core area detector 202 is capable of determining core area 252 of a search image by generating a modified search image 250' with core area 252 and regions external to core area 252 masked. In the example, core area detector 202 determines the core area 252 by generating an image salient map from a plurality of layers of search image 250. Core area detector 202 further determines a connected area based on the image salient map that defines the core area 252 within a modified version of search image 250 shown as search image 250'.

In one or more embodiments, core area detector 202 is capable of performing saliency processing on a received image to determine core area 252 of search image 250. Core area 252 includes features (e.g., objects) considered to be salient. As noted, salient objects are considered objects of the image that are most noticeable or important as perceived by an end user. In one example implementation, core area detector 202 may be implemented as described in Yan et al., "Hierarchical Saliency Detection," IEEE Conference on Computer Vision and Pattern Recognition (CVPR) (2013), which is incorporated herein by reference in its entirety. In general, core area detector 202 is capable of extracting a plurality of image layers from search image 250. Core area detector 202 computes a plurality of saliency cues expressed as a cue map for each image layer. Core area detector 202 also generates a hierarchical tree model (e.g., an inference tree) of the saliency cues that is used to generate a final saliency map.

Core area detector 202 uses a scale point of view and multi-layer approach to analyze saliency cues, which differs from other techniques that utilize varying patch sizes or downsizing of images. The scale-based region handling is performed by finding saliency values optimally in the hierarchical tree model. Core area detector 202 calculates the connected area-based saliency map and provides a convex hull of the connected area(s) that defines the core area 252.

Search image 250', as output from core area detector 202, may be an image of the same size as search image 250. Within search image 250', only the core area 252 is kept or preserved. Regions external to core area 252 may be masked out. For example, the pixel values of pixels located outside of core area 252 may be set to 0.

In block 304, D-SIFT 204 is capable of applying D-SIFT processing to search image 250' to generate a plurality of feature descriptors 254. Feature descriptors 254 may be D-SIFT feature descriptors. SIFT is a computer vision algorithm that detects, describes, and is capable of matching local features in images. The SIFT algorithm is described in greater detail in Lowe, "Object recognition from local scale-invariant features," Proceedings of the International Conference on Computer Vision. Vol. 2. pp. 1150-1157 (1999), and in U.S. Pat. No. 6,711,293, both of which are incorporated herein by reference in their entirety. Whereas the SIFT algorithm determines a feature descriptor at only selected locations, D-SIFT 204, as described herein, determines a feature descriptor at every location. In general, each feature descriptor 254 includes (x, y) coordinates defining a keypoint and a 128-dimension vector that describes a region surrounding the keypoint.

For example, D-SIFT 204 is capable of rolling over search image 250' without overlap and calculating gradient orientations as feature descriptors 254. D-SIFT 204 determines a set of stable keypoints and corresponding 128-dimension vectors as the feature descriptors 254. Each feature descriptor specifies a location, scale, and orientation. D-SIFT 204 computes the feature descriptor for the local image region about each keypoint that is highly distinctive and invariant to variations such as changes in viewpoint and illumination. To do this, in one or more embodiments, D-SIFT 204 generates a 16×16 window around each keypoint and divides each of the blocks into 16 sub-blocks of 4×4 size. Each feature descriptor 254 may be specified as the keypoint in combination with a 128-dimension (128-d) normed vector that represents an 8 main orientation histogram of 4×4 cells around the center key point. Feature descriptors 254 are output from D-SIFT 204 and are provided to capsule vector generator 206 as input.

Figure 4:
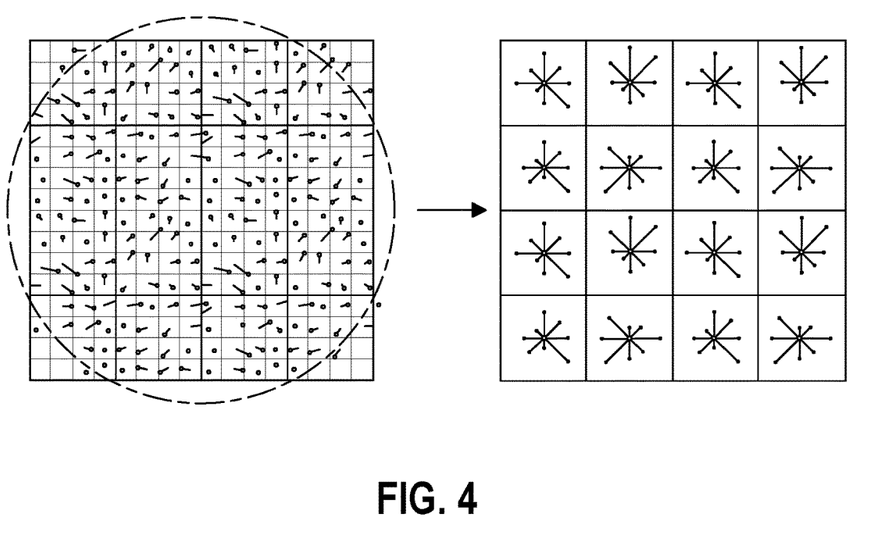
FIG. 4 illustrates an example of histogram creation as performed by the dense scale invariant feature transformer (D-SIFT) of FIG. 2.

FIG. 4 illustrates an example the creation of the 8 main orientation histogram of 4×4 cells created by D-SIFT 204 from the 16 sub-blocks of 4×4 size. As generally known, for a keypoint, the D-SIFT feature is calculated around the spatial area. The whole area is split into 16 bins formed of 4 rows and 4 columns. Each bin is a 6*6 matrix. The gradient magnitude and direction is calculated for each bin to represent 8 main directions for each bin. The resulting D-SIFT output for a keypoint is a 4*4*8=128 dimension vector.

In block 306, capsule vector generator 206 is capable of generating a plurality of capsule vectors 256 for search image 250' from different ones of feature descriptors 254. In general, capsule vector generator 206 is capable of generating the capsule vectors 256 as a two-step process that involves dynamic routing and packing. Block 306 is a feature extraction operation in that each capsule vector 256 that is generated represents a particular local feature of the search image.

Dynamic router 212 is capable of performing a dynamic routing algorithm for the feature descriptors 254 by operating on the D-SIFT keypoints having a norm that is greater than a threshold. In one or more embodiments, the threshold is set to 0.01. For example, dynamic router 212 is capable of starting from a D-SIFT feature descriptor k having coordinates (x, y) and a 128-d feature vector k to determine a series [k1, k2, k3, k4 . . . ] that can be used to represent local features around the key point (x, y).

The pseudo code of Listing 1 illustrates an example implementation of the dynamic routing algorithm that may be performed by dynamic router 212. The pseudo code of Listing 1 performs feature extraction by, for each keypoint k having a norm greater than 0.01, determining a point around the keypoint k of maximum energy in the above, below, left, or right direction. The point of maximum energy defines a direction indicating a routing direction from the keypoint (e.g., feature descriptor) to a neighboring keypoint (e.g., feature descriptor). Dynamic router 212 finds a route defining a series of keypoints, e.g., a group of keypoints, up to a predetermined maximum number of such keypoints, e.g., a maximum length. The chain of keypoints formed up to the maximum length are packed together as a capsule vector. That is, for each group, a capsule vector is generated. In one embodiment, the capsule vector is generated by determining a weighted sum of the feature vectors of the group.

In Listing 1, N is a predefined number. The p below is also a D-SIFT descriptor that has coordinates (xp, yp,) and a 128-dimension feature vector p, and n is the iterate variable.

---
Listing 1
---

Step1: Start from a DSIFT feature k ∈ $R^{128}$, iterate until n reach N
$b_k^0 \leftarrow 0$
Step2: Loop 4 times for p in upper, bottom, right and left sides of key point (x, y)
  $c_{p,k}$, $s_p$ are middle state variables, $v_p$ determine which side of key point can be append into routing series.
    $c_{p,k} \leftarrow$ Softmax(p $b_k^n$)
    $s_p \leftarrow \Sigma\, c_{p,k}$ k
    $v_p \leftarrow$ squash($s_p$)
Step3: To find the max $v_p$ in the 4 sides of key point(x,y), and append the descriptor p into routing series
  $v_p \leftarrow$ max($v_p$)
Step4: Update state variable b:
  $b_k^{n+1} \leftarrow b_k^n + kv_p$
Step5: Update iterate variable and go back to step 2
  n ← n+1, k ← p

---

The squash function is defined below in Expression 1.

$$\text{squash}(x) = \frac{\|x\|^2}{1 + \|x\|^2} \frac{x}{\|x\|} \quad (1)$$

Capsule vector packer 214 is capable of calculating a weighted sum of the feature descriptors to generate each capsule vector. In this manner, the low-level feature descriptors generated by D-SIFT 204 may be packaged together as larger, yet still local, features called capsule vectors. Capsule vector packer 214 packs different feature descriptors 254 together as capsule vectors 256 which, based on similar bins, keep the same spatial and magnitude information in different keypoints.

Figure 5:
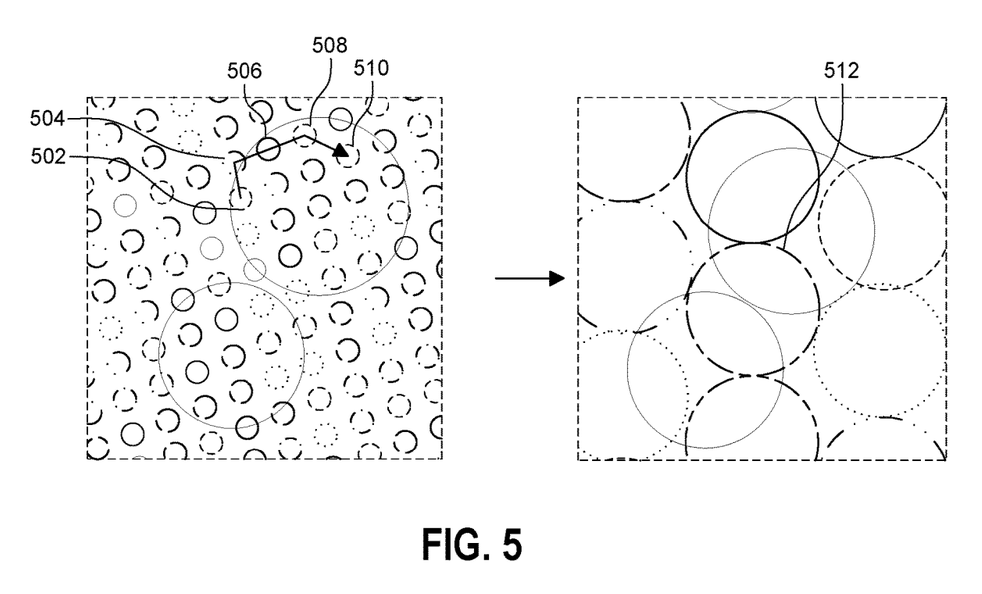
FIG. 5 illustrates an example of the dynamic routing and packing performed by the capsule vector generator of FIG. 2.

FIG. 5 illustrates an example of the dynamic routing and packing performed by capsule vector generator 206. In the example of FIG. 5, dynamic router 212 has started with keypoint 502 (e.g., which has a norm greater than 0.01) and determined that the maximum energy is in the above direction. Accordingly, dynamic router 212 has routed from keypoint 502 to keypoint 504. Dynamic router 212 determines that the maximum energy for keypoint 504 is to the right and has routed from keypoint 504 to keypoint 506. Dynamic router 212 determines that the maximum energy for keypoint 506 is to the right and has routed from keypoint 506 to keypoint 508. Dynamic router 212 determines that the maximum energy for keypoint 508 is down and to the right and has routed from keypoint 508 to keypoint 510. Capsule vector packer 214 forms a capsule vector 512 to include keypoints [502, 504, 506, 508, 510]. Capsule vector 512 defines a local feature of search image 250.

The feature descriptors, as generated by D-SIFT 204, can represent local features. The difference between a useful feature descriptor and a useless feature descriptor, in terms of determining fine-grained similarities among images, is not significant enough for detecting such fine-grained similarities. Accordingly, similar feature descriptors are packaged as a capsule vector. As a capsule vector, the difference between a useful capsule vector and a useless capsule vector, for purposes of matching a target image to an image of a dataset to detect fine-grained similarities, becomes large enough to detect.

In block 308, vector comparator 208 is capable of comparing each capsule vector of the search image 250 with a corresponding capsule vector for each image of dataset 220 to generate a top-K matrix 258. Top-K matrix 258 may be determined using a vector search technique that determines, for each capsule vector of the search image, the most closely matching capsule vector of an image of the dataset 220, the next most closely matching capsule vector of an image of dataset 220, and so on. That is, for each capsule vector of the search image, vector comparator 208 determines a sorted list that descends of the most closely matching capsule vector of each image of the dataset 220.

Figure 6:
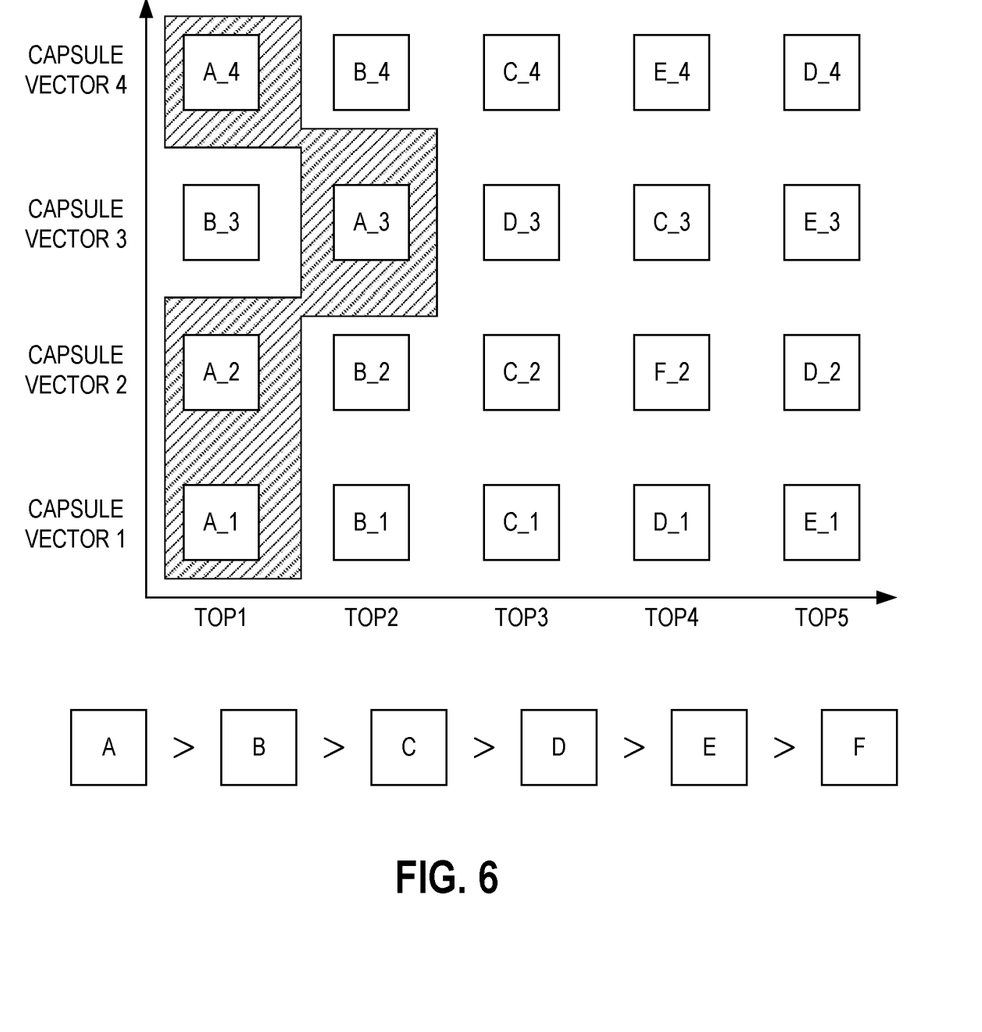
FIG. 6 illustrates an example of the top-K matrix generated by the score calculator of FIG. 2.

FIG. 6 illustrates an example of the top-K matrix 258 generated as part of block 308 by vector comparator 208. In the example, the vertical axis represents 5 different capsule vectors 1, 2, 3, 4, and 5 determined from search image 250. The horizontal axis represents the top-N groups of images having capsule vectors matching the respective capsule vectors of the search image. For example, referring to capsule vector 1 of the search image, image A of the dataset has a capsule vector (e.g., a local feature) that most closely matches capsule vector 1 based on the vector comparison (e.g., denoted as A_1), followed by image B with the second most closely matching capsule vector denoted as B_1, followed by image C with the third most closely matching capsule vector denoted as C_1, followed by image D, and followed by image E. For each capsule vector, the row illustrates the capsule vector and corresponding image that most closely matches the capsule vector of the search image in decreasing order from left to right. Put another way, the column TOP1 illustrates the capsule vector and corresponding image that most closely matches each of capsule vectors 1-4 of the search image. The column TOP2 illustrates the second most closely matching capsule vector and corresponding image for each of capsule vectors 1-4 of the search image, and so forth.

Figure 7:
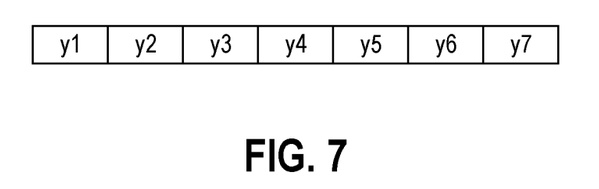
FIG. 7 illustrates an example of the encoding applied to a capsule vector.

In one or more embodiments, the feature descriptors may be encoded as 8-byte data components. Encoding the feature descriptors as 8-byte data components may be performed using a product quantizer (not shown) that compresses the 128-d feature vector as an 8-byte data component to facilitate faster and more computationally efficient vector searching of the search space (e.g., of dataset 220). The encoding supports approximate matching that accelerates the query speed by establishing a query cluster and implements the search as a two-stage query. For example, the product quantizer, for each feature, may split the 128-dimensions into 8 parts y1, y2, y3, y4, y5, y6, y7, and y8 as shown in FIG. 7. In the example, each of the 8 parts includes 16 components that may be encoded as a bind code having a value of 0 to 255. The product quantizer may operate with two stages including an initial stage and a query stage. The initial stage creates a search indexer with all of the data. When searching, the query vector is first encoded into an 8-byte representation. Once encoded, a nearest data point to the 8-byte representation is found that has the same 8-byte encoding. In converting the 128-d vector to an 8-byte representation, some data precision loss occurs. The product quantizer is capable of establishing 256 clusters for every part and returning a nearest cluster index to represent the part.

In one or more embodiments, the vector comparison (e.g., the encoding and searching described above) may be implemented using a library such as the Facebook AI Similarity Search (FAISS) library that FAISS (Facebook AI Similarity Search) is a library that provides efficient similarity search and clustering of dense vectors.

In block 310, score calculator 216 is capable of calculating similarity scores for the capsule vectors of the top-K matrix 258. The similarity scores calculated for the top-K matrix 258 are capsule vector-specific and image specific. In one or more embodiments, the similarity score may be calculated as a two-part score that includes a Gaussian component and a distance component. The two components and the total score may be computed using score calculator 216.

In one or more embodiments, score calculator 216 is capable of computing a similarity score for each capsule vector represented in the top-K matrix 258. For example, score calculator 216 is capable of calculating a similarity score between capsule vectors of the target image and the capsule vectors represented in the top-K matrix 258. For (i, j) rows and columns of the top-K matrix, each similarity score may be calculated according to Expression 2 below.

$$s[i,j] = \alpha * \text{norm}(i) + (\beta - \text{softmax}(\text{distance}(i,j))) \qquad (2)$$

The distance (e.g., softmax) component accounts for the distance between two vectors. The closer the two vectors are in terms of distance, the smaller the distance (i, j) will be so that ($\beta$−softmax (distance (i, j))) will be higher. The Gaussian (e.g., norm) component is a discrete function where the value of i is in the range of 1 to K, where the value of norm(i) decreases respectively. The Gaussian component accounts for the principle that the Top1 result should take a higher score than the Top2 result.

As illustrated, the similarity score may include a Gaussian component represented by the "norm" function and a distance component represented by the "softmax" function. In the example of Expression 2, the "norm" function may be adjusted using the constant $\alpha$ and the "softmax" function may be adjusted using the constant $\beta$. For purposes of illustration and not limitation, $\alpha$ and $\beta$ each may be set to 0.5. It should be appreciated, however, that other values may be used in other embodiments. Expression 2 may be calculated by score calculator 216 where the norm is calculated using Expression 3 below.

$$\text{norm}(i) = N\left(0, \frac{K}{3}, i\right) - N\left(0, \frac{K}{3}, i+1\right) \qquad (3)$$

In Expression 3, N is the normal distribution having a mean of 0. Variance is the square of K/3, and i is the input value for the normal distribution.

Softmax is calculated using Expression 4 below.

$$\text{Softmax}\left(z_i = \frac{\exp(z_i)}{\sum_j \exp(z_j)}\right) \qquad (4)$$

In Expression 4, for a defined vector z, softmaxt($z_i$) is the e-based exponential of $z_i$ divided by the sum of the e-based exponential of z.

In block 312, image scorer 218 is capable of summing the similarity scores determined for the top-K matrix for each image represented therein. As noted, the similarity scores determined in block 310 for the top-K matrix are capsule vector-specific and image specific. For example, for each image of the dataset and/or as represented in the top-K matrix, image scorer 218 is capable of calculating a bundled similarity score. Image scorer 218 calculates the bundled similarity score for each image of the dataset by summing the individual, or capsule vector-specific similarity scores for the image. Taking image A of the dataset as an example, image scorer 218 sums the similarity score of the capsule vectors of the top-K matrix A_1, A_2, A_3, and A_4 corresponding to each of the capsule vectors 1-4. The shaded region illustrates that image A has the closest matching capsule vector for each of capsule vectors 1, 2, and 4 of the search image and the second closest matching capsule vector for capsule vector 3 of the search image. The bundled score for image A is calculated by summing the similarity scores of the capsule vectors of image A that most closely match each capsule vector 1-4 of the search image.

In block 314, image scorer 218 is capable of outputting search results 260. The search results 260 are determined based on the bundled similarity score for the respective images of the dataset or top-K matrix as the case may be. For example, in performing block 314, image scorer 218 is capable of selecting one or more images of the dataset having fine-grained similarity with the search image based on a summation of the vector-specific similarity scores for the images of the dataset. Alternatively, or in combination, image scorer 218 is capable of sorting the images of the dataset according to how closely each image matches the search image. As shown in FIG. 6, image scorer 218 has ranked images of the dataset in decreasing order based on their respective bundled similarity scores. The ranking from greatest bundled similarity score to least goes from left to right as images: A, B, C, D, E, and F.

The terminology used herein is for the purpose of describing particular embodiments only and is not intended to be limiting. Notwithstanding, several definitions that apply throughout this document now will be presented.

The term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "processor" means at least one hardware circuit configured to carry out instructions. The instructions may be contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of image processing for searching a dataset of images, comprising:
   receiving a search image within computer hardware;
   generating, from the search image, a modified search image having a core area with regions external to the core area masked, wherein the core area is generated by a core area detector generating an image salient map from a plurality of layers of the search image and determining a connected area of the plurality of layers as the core area;
   generating, using the computer hardware and from the modified search image, feature descriptors;
   generating, using the computer hardware, a plurality of capsule vectors for the search image from different ones of a plurality of keypoints of the feature descriptors, wherein generating a capsule vector of the plurality of capsule vectors comprises:
   identifying, for a keypoint of the plurality of keypoints having a norm that satisfies a predetermined threshold, a chain of keypoints based on a routing directing of the keypoint; and
   packing the chain of keypoints to form the capsule vector;
   comparing, using the computer hardware, capsule vectors of the search image with capsule vectors of each image of the dataset to generate a top-K matrix of capsule vectors for the images of the dataset;
   computing similarity scores for the top-K matrix of capsule vectors;
   selecting, using the computer hardware, one or more images of the dataset having fine-grained similarity with the search image based a bundled similarity score for each image of the dataset, wherein the bundled similarity score is a summation of the similarity scores of the images of the dataset from the top-K matrix; and
   outputting the one or more images as selected as a search result by performing at least one of displaying the search result or transmitting the search result to another system.

2. The method of claim 1, wherein each similarity score of the top-K matrix is capsule vector specific and image specific.

3. The method of claim 2, wherein the bundled similarity score for each image is a summation of each similarity score for the image.

4. The method of claim 2, wherein each similarity score includes a gaussian component and a distance component.

5. The method of claim 1, wherein the generating the capsule vector of the plurality of capsule vectors comprises:
   performing dynamic routing of the feature descriptors to form groups of selected ones of the feature descriptors; and
   for each group, generating the capsule vector by determining a weighted sum of the feature descriptors of the group.

6. The method of claim 5, wherein the groups include a maximum number of keypoints.

7. The method of claim 1, wherein the feature descriptors are generated using a dense scale invariant feature transformer algorithm.

8. A system, comprising:
   one or more processors configured to execute image processing operations for searching a dataset of images including:
   receiving a search image within computer hardware;
   generating, from the search image, a modified search image having a core area with regions external to the core area masked;
   generating, using the computer hardware and from the modified search image, feature descriptors;
   generating, using the computer hardware, a plurality of capsule vectors for the search image from different ones of a plurality of keypoints of the feature descriptors;
   wherein the generating the plurality of capsule vectors comprises performing dynamic routing of the feature descriptors to form groups of selected ones of the feature descriptors and, for each group, generating a capsule vector by determining a weighted sum of the feature descriptors of the group;
   comparing capsule vectors of the search image with capsule vectors of each image of the dataset to generate a top-K matrix of capsule vectors for the images of the dataset;

computing similarity scores for the top-K matrix of capsule vectors;

selecting one or more images of the dataset having fine-grained similarity with the search image based a bundled similarity score for each image of the dataset, wherein the bundled similarity score is a summation of the similarity scores of the images of the dataset from the top-K matrix; and outputting the one or more images as selected as a search result by performing at least one of displaying the search result or transmitting the search result to another system.

9. The system of claim 8, wherein each similarity score of the top-K matrix is capsule vector specific and image specific.

10. The system of claim 9, wherein the bundled similarity score for each image is a summation of each similarity score for the image.

11. The system of claim 9, wherein each similarity score includes a gaussian component and a distance component.

12. The system of claim 8, wherein the groups include a maximum number of keypoints.

13. The system of claim 8, wherein the feature descriptors are generated using a dense scale invariant feature transformer algorithm.

14. A computer program product comprising one or more computer readable storage mediums having program instructions embodied therewith, wherein the program instructions are executable by one or more processors to cause the one or more processors to execute image processing operations for searching a dataset of images comprising:

receiving a search image within computer hardware;

generating, from the search image, a modified search image having a core area with regions external to the core area masked;

generating, using the computer hardware and from the modified search image, feature descriptors;

generating, using the computer hardware, a plurality of capsule vectors for the search image from different ones of a plurality of keypoints of the feature descriptors;

wherein the generating the plurality of capsule vectors comprises performing dynamic routing of the feature descriptors to form groups of selected ones of the feature descriptors and, for each group, generating a capsule vector by determining a weighted sum of the feature descriptors of the group;

comparing capsule vectors of the search image with capsule vectors of each image of the dataset to generate a top-K matrix of capsule vectors for the images of the dataset;

computing similarity scores for the top-K matrix of capsule vectors; and selecting one or more images of the dataset having fine-grained similarity with the search image based a bundled similarity score for each image of the dataset, wherein the bundled similarity score is a summation of the similarity scores of the images of the dataset from the top-K matrix; and outputting the one or more images as selected as a search result by performing at least one of displaying the search result or transmitting the search result to another system.

15. The computer program product of claim 14, wherein each similarity score of the top-K matrix is capsule vector specific and image specific.

16. The computer program product of claim 15, wherein the bundled similarity score for each image is a summation of each similarity score for the image.

17. The computer program product of claim 15, wherein each similarity score includes a gaussian component and a distance component.

18. The computer program product of claim 14, wherein the groups include a maximum number of keypoints and the feature descriptors are generated using a dense scale invariant feature transformer algorithm.

\* \* \* \* \*